UNITED STATES PATENT OFFICE.

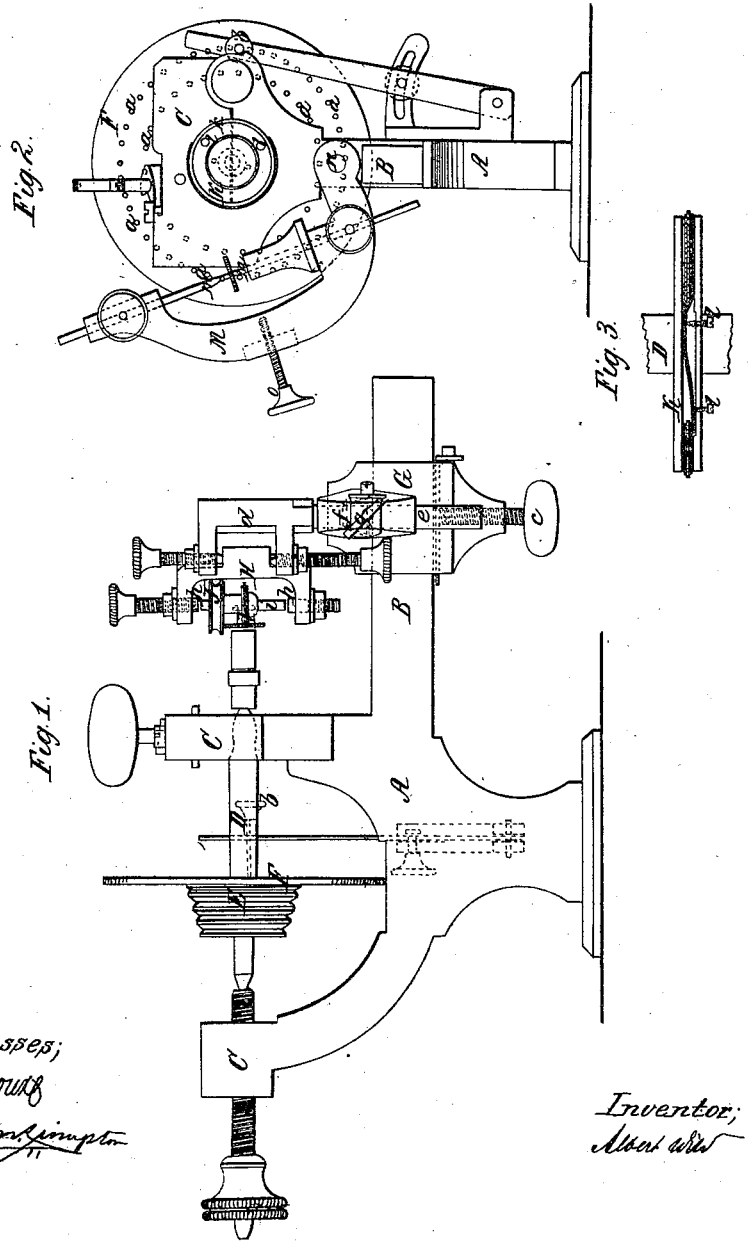

ALBERT WILD, OF NEW YORK, N. Y., ASSIGNOR TO DINKELSPEIL & OPPENHEIMER, OF SAME PLACE.

WATCHMAKER'S LATHE.

Specification of Letters Patent No. 29,227, dated July 17, 1860.

*To all whom it may concern:*

Be it known that I, ALBERT WILD, of the city, county, and State of New York, have invented certain new and useful Improvements in Watchmakers' Lathes; and I do hereby declare that the following is a full, clear, and exact description of the same, reference being had to the accompanying drawing, forming a part of this specification, in which—

Figure 1, represents a side elevation of a watch-makers lathe, rigged up according to my invention for cutting gear. Fig. 2, is a front elevation of the same with my device for rounding the teeth of gear wheels. Fig. 3, is a detached side elevation of the self feeding spiral toothed cutter for rounding the teeth in an enlarged scale.

Similar letters of reference in the three views indicate corresponding parts.

My invention consists, first, in arranging on the shear of a watch-makers lathe a sliding head with a swinging frame which receives the rotary cutter in such a manner, that by swinging said frame backward and forward, the cutter is forced toward and from the center of the lathe spindle or of the wheel and thereby the cutting is produced; second, in the arrangement of a pivoted two armed lever provided with adjustable centers to receive and hold the wheels after the same have undergone the first operation of cutting, and furnished with a set screw to determine and regulate the depth to which the teeth of the wheel are to be worked, in combination with a spiral toothed self feeding cutter for the purpose of rounding off the teeth and to regulate their depth and the diameters of the wheels.

To enable those skilled in the art to make and use my invention I will proceed to describe its construction and operation with reference to the drawing.

The frame A of my lathe with the shear B, is of the ordinary construction. The two arms or heads C, form the bearings for the lathe spindle D which is rotated by means of a grooved cone pulley E, and which carries a plate F the face of which is marked with a series of circles divided in different numbers of parts according to the number of teeth to be cut in different wheels. The different parts on the plate F, are indicated by small holes $a$, and a pointed spring dog $b$, catching into these holes serves to retain the plate and the spindle at the desired points.

A head G is made to slide on the shear B, and it is adjustable in the same by means of a thumb screw, $c$. The upper part $d$, of this head is adjustable in a vertical direction by means of a stem $e$, sliding up and down in a socket $f$, and retained in the desired position by a set screw $g$. The two arms of the upper part $d$, of the head G, form the bearings for a swinging frame H, provided with two centers $h$, $h$, to receive a little shaft $i$ that carries the cutter I. A pulley J, serves to impart motion to the cutter shaft by hand or by any other power.

The wheel to be cut is adjusted in the end of the lathe spindle D, in the usual manner, the number of teeth is determined by the spring dog $b$, and by the division plate F, and the head G, is now moved up on the shear and adjusted so as to bring the cutter I, opposite to the center of the wheel, and the teeth are cut by imparting to the cutter a rotary motion and by swinging the frame H, to and from the center of the wheel. By these means the cutting is accomplished in a very short time and with little trouble. Slanting or oblique teeth are cut by raising or lowering the swinging frame H, together with the upper part $d$, of the head G.

After the teeth have been cut with the cutter I, their corners have to be rounded and the proper diameter of the wheel has to be adjusted. This is effected by means of a rounding off cutter K, of peculiar construction. A portion of the cutter is taken out as clearly shown in Fig. 3, and a spiral tooth $k$ is inserted the curvature of which is adjustable by means of two set screws $l$, $l$. This tooth is adjusted according to the pitch of the wheel to be operated upon and if brought to act on the wheel, the effect of this tooth is such that for every revolution of the cutter the wheel advances one tooth. If the cutter is rotated and the wheel is forced up against its edge the several teeth of the wheel will come in contact with the cutter one after the other and they are rounded off instantaneously.

With my lathe the wheel is fastened between the centers $m$, $m$, of a two armed lever M, which is secured to the front side of the head stock of the lathe by means of a pivot $n$, in such a manner that it swings to and from the center of the lathe spindle or of the cutter, which is fastened in the end of this spindle. A set screw *o*, passing through the side of the lever M, and striking against the side of the head stock, determines the depth to which the teeth are to be worked out. A rotary motion is now imparted to the cutter K, and the wheel having been adjusted in the lever M, is forced against the cutter until the set screw *o*, arrests its progress. The teeth are thereby all rounded off and worked out to a uniform depth and if it is desired to still further reduce the diameter of the wheel, the set screw *o* is screwed back and the wheel subjected to a fresh operation, until its diameter has attained the required size.

By this arrangement all wheels commonly used by watch-makers can be cut out and adjusted to the proper diameter on a common lathe and all the parts requisite for cutting gear can easily be removed, if it is desired to use the lathe, for turning, or any other operation.

Having thus fully described my invention, what I claim as new and desire to secure by Letters Patent, is—

1. The arrangement in combination with the shear B, of a watch makers lathe of the sliding head G, with the vertically adjustable part *d*, and with the swinging frame H, constructed and operating in the manner and for the purpose set forth.

2. The combination with the spiral toothed adjustable cutter K, of the pivoted two-armed lever M, with the set screw *o*, constructed and operating substantially as and for the purpose described.

ALBERT WILD.

Witnesses:
M. M. COMPTON,
B. GIROUXE.